United States Patent Office 2,727,014
Patented Dec. 13, 1955

2,727,014

METHOD FOR RETARDING PREVULCANIZATION OF RUBBER MIXES

Lynn Harbison, Akron, Ohio, assignor to Phillips Petroleum Company, a corporation of Delaware No Drawing. Application March 24, 1952,
Serial No. 278,300

25 Claims. (Cl. 260—41.5)

This invention relates to the production of rubber products. In one of its more specific aspects it relates to the retardation of vulcanization of rubber mixes. In still another one of its more specific aspects it relates to retarding to rapid acceleration of vulcanization caused by high pH carbon black. In still another of its more specific aspects it relates to new vulcanized rubber products.

In the manufacture of molded rubber products, crude rubber is milled with desired fillers, softeners, sulfur and accelerators. In the first stage of plant processing, carbon black and other ingredients, except the accelerator of vulcanization and sulfur, are added with the mixing temperature reaching a maximum in the range of 290° to 350° F., especially for tread compounds. A mixed stock, whether mill mixed or Banbury mixed, is cooled with a water spray in order to aid in reducing the temperature of the mixed stock to room temperature as soon as possible. After this first stage mixing, the rubber mix is placed on what is termed a "sheet-out" mill and the mixed stock is cut in slabs and subjected to a water spray. These slabs are then cooled in the air, usually for about one-half to three-quarters of an hour, and then placed on a skid to age, generally for a minimum of 5 hours. The second step is to take this master batch form and add the accelerator and sulfur in a Banbury mixer or on a mill. During this step the temperature should not be greater than about 230° F., decidedly cooler than the original mix when the carbon black is added. This final mix is cooled with a water spray, air-cooled and then aged at room temperature. This mixed stock is cooled as rapidly as possible in order to avoid "scorched" material. Two stage mixing is customarily employed but direct mixing is also employed. This process permits omission of cooling between master-batching and the final mix. The next step in processing is calendering or tubing which is usually carried on in the range of 150° to 300° F. The calendered or tubed product is then vulcanized. The most common vulcanizing temperature for tires is 260° to over 300° F. For very large tires the curing temperature may be dropped to as low as 260° F. In the case of molded industrial products a temperature of about 320° F. is the upper range at which vulcanization is carried out. In carrying out the plant processes of final mixing and of calendering or tubing, it is necessary that the mixed rubber is not partially vulcanized prematurely. If vulcanization occurs prematurely in factory processing, factory operations cannot be carried out. This premature vulcanization is known as scorching.

In recent years many new carbon blacks have become available to the rubber industry. Chief among these new carbon blacks are combustion furnace blacks, which in general have a higher pH than the older type of channel black or thermal furnace blacks. Combustion furnace carbon blacks have a pH above 8, generally from 8 to 10.5 and usually from 8.6 to 10.1. For instance, one commercially available high abrasion combustion furnace (HAF) black, has a pH of approximately 9.1, a commercially available medium abrasion furnace (MAF) black, has a pH of approximately 9.7 and a recently developed super high abrasion combustion furnace (SAF) black has a pH also above 9. In contrast to the pH of these combustion furnace blacks, channel blacks usually have a pH value on the acid side in the neighborhood of 3.8 to 6. Furnace blacks such as those just mentioned have many characteristics which add useful properties to the finished rubber product. Thus, the HAF black has a high degree of "structure" and rubber products containing this black have very good resistance to abrasion. There are several high pH furnace blacks now on the market which add valuable properties to the finished rubber product. These high pH carbon blacks have caused considerable difficulty to the rubber compounder and processor as pointed out by C. W. Sweitzer and W. C. Goodrich in the Rubber Age, volume 55, No. 5, August 1944, at page 471. The pH of the carbon blacks has a decided effect on the rate of vulcanization. High pH carbon blacks accelerate cure or vulcanization. Sweitzer and Goodrich point out that due to this factor economy in organic acceleration is permitted. However, in most cases changing the recipe of a rubber mix, that is, changing the amount of organic accelerator and sulfur, also changes the properties of the finished rubber product. It has an effect on such properties as tensile strength, heat build-up, the compression set, the hardness, the resistance to abrasion, the modules of elasticity, the elongation, etc. Accelerator starvation with HAF black results in low abrasion resistance. The rubber compounder using these high pH carbon blacks has been confronted with the problem of maintaining the desired properties in the finished product by maintaining the proper amount of organic accelerator and sulfur while trying to overcome the problem of scorch or premature vulcanization. Well-known retarders of vulcanization such as N-nitroso diphenyl amine, rosin and salicylic acid in a dispersing agent have been unsuccessful in overcoming the problem.

In at least one modification of this invention at least one of the following objects is attained.

It is an object of this invention to provide a method for retarding vulcanization of rubber mixes.

Another object of this invention is to provide a method by which premature vulcanization caused by the use of high pH carbon blacks in conjunction with organic accelerators of vulcanization can be overcome.

Still another object of my invention is to produce new vulcanized rubber products.

Still another object of this invention is to increase the Mooney scorch time of rubber mixes.

Still another object of this invention is to provide a method to increase the Mooney scorch time of a rubber mix which has a low scorch time due to a high pH carbon black being present in the mix.

Many other objects of this invention will become apparent to one skilled in the art from this disclosure.

Premature vulcanization, referred to as "scorch" during the processing of rubber products, must be prevented in order to allow the rubber mix to be preformed and shaped before it is cured or vulcanized. Testing methods, run on test samples, have been devised and standards have been set so as to determine if a particular rubber mix will scorch during processing. The most frequently used testing method is that run on a Mooney shearing disc viscometer. These Mooney viscometers come equipped with a large rotor (1½ inches in diameter) and a small rotor (1³⁄₁₆ inches in diameter). The viscometer can be set to operate at any given temperature. The Mooney scorch test is made by using the small rotor with the machine usually set to operate at 250° F., that is, the temperature of the rubber sample on which the scorch test is being run is held at 250° F. Primarily the instrument consists of a disc rotor which turns in a shallow cylindrical chamber recessed into two horizontal platens. The surfaces of the chamber and rotor are knurled to prevent slippage. The sample is formed in place around the rotor as the chamber is closed. The rubber is sheared by the rotor which is driven by a synchronous motor. The resistance of the rubber to this shearing action develops a thrust in a floating horizontal worm shaft which presses against a deflecting U-shaped steel spring. The deflection is read on a dial gauge and is proportional to the true mean viscosity of the sample. In determining the scorch time, deflection readings are taken at one minute intervals until the deflection of the indicator increases appreciably. At this point the viscosity of the rubber mix sample has increased due to the beginning of vulcanization. The Mooney scorch time is then given as the time in minutes at which vulcanization began, indicated by the appreciable increase in viscosity readings. In this disclosure Mooney scorch time when used means the time in minutes at which the viscosity of the sample began to increase appreciably because of vulcanization. Mooney shearing disc viscometers are widely used in the rubber industry, and one skilled in the art will have no difficulty in determining and understanding what I mean by the Mooney scorch time.

I have discovered that compounds having the structural formula

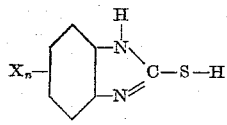

wherein X is selected from the group consisting of hydrogen, a halogen, an alkyl radical of not more than 12 carbon atoms, an alkoxy radical of not more than 12 carbon atoms, a nitro radical and a cyano radical and wherein $n$ is an integer from 1 to 2 will effectively retard vulcanization of rubber mixes wherein high pH combustion furnace carbon blacks are employed. Alkyl radicals which are applicable in the above general formula include methyl, ethyl, propyl, butyl, amyl, etc. and alkoxy radicals include methoxy, ethoxy, propoxy, butoxy, amoxy, etc. Compounds having the above described structure include mercaptobenzimidazol, halomercaptobenzimidazol, such as chloromercaptobenzimidazol, fluoromercaptobenzimidazol, and bromomercaptobenzimidazol, methyl mercaptobenzimidazol, ethyl mercaptobenzimidazol, propyl mercaptobenzimidazol, butyl mercaptobenzimidazol, amyl mercaptobenzimidazol, methoxy mercaptobenzimidazol, ethoxy mercaptobenzimidazol, propoxy mercaptobenzimidazol, butoxy mercaptobenzimidazol, amoxy mercaptobenzimidazol, nitro mercaptobenzimidazol, cyano mercaptobenzimidazol, dimethyl mercaptobenzimidazol, diethyl mercaptobenzimidazol, dipropyl mercaptobenzimidazol, dibutyl mercaptobenzimidazol, diamyl mercaptobenzimidazol, dimethoxy mercaptobenzimidazol, diethoxy mercaptobenzimidazol, dipropoxy mercaptobenzimidazol, dibutoxy mecraptobenzimidazol, diamoxy mercaptobenzimidazol, and dicyano mercaptobenzimidazol. I have also discovered that when certain known antioxidants are combined with a compound having the above referred to formula and incorporated in a rubber mix, an unexpected increase in scorch time results. Other properties of the finished rubber, for example, abrasion resistance, flex-life, elongation characteristics, and tensile strength are also improved. This result is surprising and unexpected because there was no reason to predict that these compounds would beneficially affect a rubber mix wherein high pH furnace carbon blacks are employed in combination with sulfur as a vulcanizing agent.

My invention is applicable to rubber mixes containing organic accelerators of vulcanization. My invention is particularly adaptable to rubber mixes containing organic accelerators of various classes. For example, rubber mixes containing the aromatic thiazol accelerators as represented by benzothiazyl-2-monocyclohexyl sulfenamide (Santocure), 2-mercaptobenzothiazol (MBT) and benzothiazyl sulfide (MBTS) and other accelerators have been substantially improved from the practice of my invention. I have found that 1 to 2 parts of mercaptobenzimidazol, and certain of its derivatives, when combined with 1 to 2 parts of certain known antioxidants will effectively retard vulcanization of a rubber mix and will produce a pronounced improvement in abrasion resistance, tensile strength and elongation characteristics of a finished rubber product.

The antioxidants which can be used in the practice of this invention include Akroflex F. Thermoflex A, 4010, BLE Powder, and PBNA. These materials are commercially available anti oxidants and are described by their manufacturers as follows:

(1) Akroflex F is reported to be a mixture of phenyl-beta-naphthylamine and diphenyl-para-phenylene diamine and a rubber pigment.
(2) 4010 is reported to be the condensation product of 4-amino diphenylamine and cyclohexanol.
(3) BLE Powder is reported to be 65 per cent complex diarylamine-ketone-aldehyde reaction product and 35 per cent N,N'-diphenyl-p-phenylenediamine.
(4) PBNA is reported to be phenyl-beta-naphthylamine.
(5) Thermoflex A is reported to be 25% diparamethoxy diphenylamine, 25% diphenylpara phenylene diamine, and 50% phenyl-beta-naphthylamine.

Most rubber mixes contain from 10 to 65 parts of carbon black per 100 parts of rubber. The problem of too rapid vulcanization becomes greater as the amount of high pH furnace carbon black is increased, therefore it is necessary that a greater amount of my scorch retarding material be added as the amount of high pH furnace carbon black is incorporated into the rubber mix to effectively retard vulcanization. In practicing my invention, one skilled in the art will have no trouble in determining the amount of scorch retarding material necessary to effectively retard vulcanization for any particular recipe or rubber mix. The Mooney scorch time for any particular rubber mix can be determined and the addition of one of my scorch retarding materials referred to in the above discussion will increase this Mooney scorch time so that there will be no problem of premature vulcanization during processing.

The materials which will retard vulcanization according to my invention are particularly adaptable to the problems of tire tread manufacture in which the rubber mix, from which the tread is formed, contains from 40 to 65 parts of carbon black per 100 parts of rubber, usually natural rubber or the new synthetic copolymers of butadietne-styrene, such as GR–S rubber and recently developed "low-temperature" variants thereof. The compounds which comprise my invention are useful to retard vulcanization caused by a high pH furnace carbon black in rubber mixes containing natural, synthetic or reclaimed rubber, or various mixtures of the above-mentioned types of rubber.

Rubber mixes wherein 0.5 to 3.5 parts of accelerator, 1.5 to 3 parts of sulfur and 10 to 65 parts of high pH combustion furnace carbon black per 100 parts of rubber are used, are improved as to scorch, tensile and abrasion characteristics when mercaptobenzimidazol or certain of its derivatives, in an amount of from 0.5 to 2 parts per 100 parts of rubber, and an antioxidant selected from the group consisting of "4010," Thermoflex A, Akroflex F, BLE Powder and phenyl-beta-naphthylamine in an amount of from 0.5 to 2 parts per 100 parts of rubber, is incorporated therein.

When mercaptobenzimidazol, or certain of its derivatives, is used alone it is generally within an amount of from 0.25 to 4 parts per 100 parts of rubber. Usually from 0.5 to 2 parts of the additive per 100 parts of rubber is sufficient to satisfactorily retard vulcanization. Further in this respect when mercaptobenzimidazol, or certain of its derivatives, is combined with one of the antioxidants referred to above, the combined dosage will usually be within the above limits in order to obtain a satisfactory retardation of vulcanization and at the same time obtain improvement in the physical characteristics of the finished rubber product.

In the following examples of my invention the amounts, particular ingredients and conditions are given as typical and are not to be construed so as to narrow the scope of my invention.

Example 1

The following basic rubber recipe was used in the following tests:

| Ingredient: | Parts by weight |
|---|---|
| Smoked sheets | 100.00 |
| HAF carbon black (pH, 9.1) | 50.00 |
| Zinc oxide | 5.00 |
| Stearic acid | 3.00 |
| Plasticizer | 3.00 |
| Sulfur | 2.50 |

|  | (1) | (2) | (3) | (4) | (5) | (6) |
|---|---|---|---|---|---|---|
| Ingredients added to basic recipe, Parts by Weight: | | | | | | |
| Mercaptobenzothiazole | 0.5 | 0.5 | .06 | 0.65 | 0.5 | 0.5 |
| 4010 | 1.0 | 1.0 | 1.0 | 1.0 | | |
| Thermoflex | | | | | 1 | 1 |
| Mercaptobenzimidazol | | 1.0 | 1.5 | 2.0 | | 1 |
| Mooney Scorch at 250° F. in Minutes | 11 | 19 | 23 | 25 | 10 | 20 |

PHYSICAL TEST DATA (AGED 24 HRS. AT 212° F.)

| 60 Min. Cure at 280° F.: | | | | | | |
|---|---|---|---|---|---|---|
| 300% Modulus | 2,675 | 2,375 | 2,275 | 2,160 | | 2,070 |
| Ultimate Tensile | 2,900 | 3,280 | 3,240 | 3,240 | 2,270 | 2,850 |
| Ultimate Elongation | 350 | 420 | 440 | 480 | 290 | 415 |

DE MATTIA FLEX DATA (AGED 24 HRS. AT 158° F.)
[Crack width at 100 M flexures, oven temp. 210° F., stroke 2¼", R. P. M. 300.]

| 60 Min. Cure, seconds | .45 | .21 | .19 | .16 | .45 | .19 |
|---|---|---|---|---|---|---|

ANGLE ABRASION DATA
[ccs. loss, 11° yoke angle, 32 lb. load, 2,400 R.]

| 60 Min. Cure | 6.05 | 7.33 | 7.67 | 8.26 | 6.58 | 7.45 |
|---|---|---|---|---|---|---|

Example 2

The following basic rubber recipe was used in the example herein set forth:

| Ingredient: | Parts by weight |
|---|---|
| Smoked sheets | 100.00 |
| HAF carbon black (pH 9.1) | 50.00 |
| Zinc oxide | 5.00 |
| Stearic acid | 3.00 |
| Plasticizer | 3.00 |
| Sulfur | 2.50 |
| Santocure | 0.50 |

The results of tests on the above recipe using different antioxidants and scorch retarders are tabulated below:

|  | (1) | (2) | (3) | (4) | (5) | (6) | (7) | (8) | (9) | (10) |
|---|---|---|---|---|---|---|---|---|---|---|
| Ingredients Added, Parts by Weight: | | | | | | | | | | |
| Mercaptobenzimidazol | 1 | | | 2 | | | 1 | 1 | 1 | 1 |
| 4010 | | 1 | | | 2 | | 1 | | | |
| Akroflex F | | | 1 | | | 2 | | 1 | | |
| BLE Powder | | | | | | | | | 1 | |
| PBNA | | | | | | | | | | 1 |

MOONEY DATA

| Mooney Scorch, Min. at 250° F | 29 | 20 | 21 | 37 | 19 | 21 | 27 | 28 | 27 | 28 |
|---|---|---|---|---|---|---|---|---|---|---|

PHYSICAL TEST DATA (ORIGINAL)

| Min. Cure at 280° F.=60: | | | | | | | | | | |
|---|---|---|---|---|---|---|---|---|---|---|
| 300% Modulus | 1,790 | 2,200 | 2,080 | 1,540 | 1,960 | 2,060 | 1,750 | 1,790 | 1,760 | 1,825 |
| Ultimate Tensile | 3,975 | 4,300 | 4,050 | 3,825 | 4,060 | 4,120 | 4,075 | 4,025 | 4,050 | 4,010 |
| Ultimate Elongation | 565 | 520 | 515 | 590 | 525 | 515 | 565 | 560 | 575 | 550 |

PHYSICAL TEST DATA

| Hrs. Aged, 212° F | 72 | 72 | 72 | 48 | 48 | 48 | 48 | 48 | 48 | 48 |
|---|---|---|---|---|---|---|---|---|---|---|
| Min. Cure at 280° F.=60: | | | | | | | | | | |
| 200% Modulus | 1,320 | 1,630 | | | | | | | | |
| 300% Modulus | | | | 1,810 | 2,710 | | 2,600 | 2,340 | 2,080 | 2,060 |
| Ultimate Tensile | 1,960 | 3,040 | 1,300 | 2,580 | 2,890 | 1,910 | 3,100 | 2,750 | 2,510 | 2,480 |
| Ultimate Elongation | 350 | 355 | 195 | 405 | 305 | 255 | 365 | 360 | 355 | 360 |

DE MATTIA FLEX DATA
[Flexures in M's—oven temp. 210° F.

| Min. Cure at 280° F.=60 | 86 | 36.1 | 29.9 | 100+ | 56.7 | 47.5 | 100+ | 100+ | 100+ | 100+ |
|---|---|---|---|---|---|---|---|---|---|---|

ANGLE ABRASION DATA
[cc. loss—11° yoke angle, 32 lb. load, 2,400 R.]

| 60 Min. Cure | 8.28 | 5.52 | 6.52 | 8.93 | 4.86 | 5.78 | 6.49 | 7.78 | 7.84 | 7.60 |
|---|---|---|---|---|---|---|---|---|---|---|

Example 3

|  | (1) | (2) | (3) | (4) |
|---|---|---|---|---|
| Ingredient: | | | | |
| Smoked sheets | 100.00 | | | |
| Philblack O | 50.00 | | | |
| Zinc Oxide | 5.00 | | | |
| 4010 | 1.00 | | | |
| Mercaptobenzimidazol | 1.00 | | | |
| Methyl mercaptobenzimidazol | | 1.00 | | |
| Chloro mercaptobenzimidazol | | | 1.00 | |
| Methoxy mercaptobenzimidazol | | | | 1.00 |
| Stearic Acid | 3.00 | | | |
| Plasticizer | 3.00 | | | |
| MBTS | 0.50 | | | |
| Sulfur | 2.50 | | | |
|  | 166.00 | 166.00 | 166.00 | 166.00 |
| Mooney Data, MS at 250° F., in min | 33 | 34 | 36 | 26 |

PHYSICAL TEST DATA, STRESS-STRAIN (ORIGINAL)
[Test temp.: 75–81° F.]

|  | (1) | (2) | (3) | (4) |
|---|---|---|---|---|
| Min. Cure at 280° F.: | | | | |
| 300% Modulus, 60 | 1,600 | 1,600 | 1,490 | 1,650 |
| Ultimate Tensile, 60 | 3,500 | 3,660 | 3,610 | 3,640 |
| Ultimate Elongation, 60 | 570 | 575 | 580 | 570 |

PHYSICAL TEST DATA, STRESS-STRAIN (AGED 48 HRS. AT 212° F.)
[Test Temp.: 73–75° F.]

|  | (1) | (2) | (3) | (4) |
|---|---|---|---|---|
| Min. Cure at 280° F.: | | | | |
| 300% Modulus, 60 | 2,460 | 2,410 | 2,150 | 2,450 |
| Ultimate Tensile, 60 | 3,300 | 3,240 | 3,100 | 3,300 |
| Ultimate Elongation, 60 | 440 | 420 | 445 | 440 |

The results of the tests tabulated in Examples 1 and 2 illustrate the results obtained by the practice of my invention. In Example 1 the addition of mercaptobenzimidazol to the rubber mix results in doubling the Mooney scorch time and at the same time results in an improvement in tensile strength, per cent elongation and flex-life characteristics. Abrasion resistance is considered about equal.

The ability of mercaptobenzimidazol to retard vulcanization of rubber mixes containing high pH combustion furnace black is shown in Example 2 wherein col. 1 is compared to col. 2 and 3 and col. 4 is compared to col. 5 and 6. The data of col. 7 and 8 show that combining mercaptobenzimidazol with the other materials results in Mooney scorch times greater than the average or predicted scorch time. The physical properties of the finished rubber are improved by combining the materials according to the practice of my invention.

The results of the tests as shown in Example 3 indicate that the chloro derivative of mercaptobenzimidazol is a superior scorch retarding agent whereas the methoxy derivative is less effective than is mercaptobenzimidazol itself. Some of the physical properties of the finished rubber are, however, improved by the addition of methoxy mercaptobenzimidazol.

It is believed that a deactivating substituent such as a chloro group attached to mercaptobenzimidazol extends the scorch time of the rubber mix in which it has been incorporated whereas an activating substituent such as a methoxy group attached to mercaptobenzimidazol acts to reduce the scorch time of the rubber mix.

Variation and modification are possible within the scope of the disclosure of this invention, the essence of which is that mercaptobenzimidazol and certain of its derivatives increases the scorch time of rubber mixes containing high pH furnace carbon black and that mercaptobenzimidazol and certain of its derivatives, combined with a member selected from the group consisting of Akroflex F, BLE powder, PBNA and Thermoflex A increase the scorch time of rubber mixes containing high pH furnace carbon black more than can be predicted from the results of separate tests and that furthermore the physical properties of the resulting rubber are improved.

I claim:
1. In the process of making rubber products wherein the rubber mix, containing an organic accelerator of vulcanization, sulfur and a furnace carbon black having a pH above 8, is preformed and vulcanized, that improvement which comprises adding to said rubber mix, in an amount sufficient to retard prevulcanization, an organic antioxidant and a prevulcanization retarding material characterized by the formula

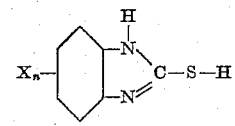

wherein X is selected from the group consisting of hydrogen, a halogen, an alkyl radical containing not more than 12 carbon atoms, an alkoxy radical containing not more than 12 carbon atoms, a nitro radical and a cyano radical and wherein $n$ is an integer from 1 to 2.

2. The process of claim 1 wherein the organic antioxidant is the condensation product obtained by reacting an aliphatic alcohol and a primary aromatic amine.

3. The process of claim 1 wherein the organic antioxidant is phenyl-beta-naphthylamine.

4. The process of claim 1 wherein the organic antioxidant is the condensation product of an aliphatic alcohol and a primary aromatic amine and the prevulcanization retarding material is mercaptobenzimidazol.

5. The process of claim 1 wherein the organic antioxidant is the condensation product of 4-aminodiphenylamine and cyclohexanol and the prevulcanization retarding material is mercaptobenzimidazol.

6. The process of claim 5 wherein the organic antioxidant is added in an amount of from 0.5 to 2 parts per 100 parts of rubber and the prevulcanization retarding material is added in an amount of from 0.5 to 2 parts per 100 parts of rubber.

7. The process of claim 1 wherein the prevulcanization retarding material is chloromercaptobenzimidazol.

8. The method of retarding prevulcanization of a rubber mix containing an accelerator, sulfur and a furnace carbon black having a pH above 8 which comprises incorporating therewith, in an amount sufficient to retard prevulcanization, a prevulcanization retarding material characterized by the formula

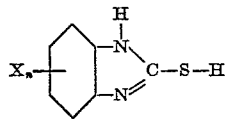

wherein X is selected from the group consisting of hydrogen, a halogen, an alkyl radical containing not more than 12 carbon atoms, an alkoxy radical containing not more than 12 carbon atoms, a nitro radical and a cyano radical and wherein *n* is an integer from 1 to 2.

9. The method of claim 8 wherein the prevulcanization retarding material is mercaptobenzimidazol.

10. The method of claim 8 wherein the prevulcanization retarding material is halomercaptobenzimidazol.

11. The method of claim 8 wherein the prevulcanization retarding material is methyl mercaptobenzimidazol.

12. The method of claim 8 wherein the prevulcanization retarding material is methoxy mercaptobenzimidazol.

13. The method of claim 8 wherein the prevulcanization retarding material is chloromercaptobenzimidazol.

14. In the process of making rubber products wherein the rubber mix, containing an organic accelerator of vulcanization, sulfur and a furnace carbon black having a pH of 8.6 to 10.1, is preformed and vulcanized, the improvement of retarding prevulcanization which comprises adding to said rubber mix mercaptobenzimidazol in an amount of from 0.5 to 4 parts per 100 parts of rubber and the condensation product of 4-aminodiphenylamine and cyclohexanol in an amount of from 0.5 to 2 parts per 100 parts of rubber as the retarding agent.

15. The process of claim 14 wherein the rubber is natural rubber.

16. The process of claim 14 wherein the rubber is synthetic rubber.

17. In the process of making rubber products wherein the rubber mix, containing 0.5 to 3.5 parts of an organic accelerator per 100 parts of rubber, 1.5 to 3 parts of sulfur per 100 parts of rubber and from 10 to 65 parts of a furnace carbon black having a pH of from 8.6 to 10.1 per 100 parts of rubber, is preformed and vulcanized, the improvement of retarding prevulcanization which comprises adding to said rubber mix mercaptobenzimidazol in an amount of from 0.5 to 2 parts per 100 parts of rubber and the condensation product of 4-aminodiphenylamine and cyclohexanol in an amount of from 0.5 to 2 parts per 100 parts of rubber as the retarding agent.

18. The process of claim 17 wherein the rubber is natural rubber.

19. The process of claim 17 wherein the rubber is synthetic rubber.

20. In the process of making rubber products wherein the rubber mix, containing 0.5 to 3.5 parts of an organic accelerator per 100 parts of rubber, 1.5 to 3 parts of sulfur per 100 parts of rubber and from 10 to 65 parts of a furnace carbon black having a pH of from 8.6 to 10.1 per 100 parts of rubber, is preformed and vulcanized, the improvement of retarding prevulcanization which comprises adding to said rubber mix mercaptobenzimidazol in an amount of from 0.5 to 2 parts per 100 parts of rubber as the retarding agent.

21. A vulcanizable rubber mix comprising rubber, an organic accelerator of vulcanization, sulfur, furnace carbon black having a pH of from 8.6 to 10.1 and a prevulcanization retarder consisting of 0.5 to 4 parts per 100 parts of rubber of a compound having the structural formula

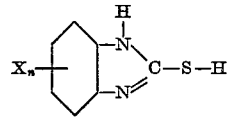

wherein X is selected from the group consisting of hydrogen, a halogen, an alkyl radical containing not more than 12 carbon atoms, an alkoxy radical containing not more than 12 carbon atoms, a nitro radical and a cyno radical and wherein *n* is an integer from 1 to 2.

22. The composition of claim 20 wherein the prevulcanization retarder consists of mercaptobenzimidazol together with the condensation product of 4-aminodiphenylamine and cyclohexanol.

23. A vulcanizable rubber mix comprising rubber, from 0.5 to 3.5 parts of an organic accelerator per 100 parts of rubber, from 2 to 3 parts of sulfur per 100 parts of rubber, from 10 to 65 parts of combustion furnace carbon black having a pH of from 8.6 to 10.1 per 100 parts of rubber and from 0.5 to 2 parts per 100 parts of rubber of a prevulcanization retarding material having the structural formula

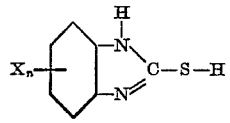

wherein X is selected from the group consisting of hydrogen, a halogen, an alkyl radical containing not more than 12 carbon atoms, an alkoxy radical containing not more than 12 carbon atoms, a nitro radical and a cyano radical and wherein *n* is an integer from 1 to 2.

24. The process of producing improved rubber products which comprises preparing a rubber mix containing 0.5 to 3.5 parts of an organic accelerator per 100 parts of rubber, 1.5 to 3 parts of sulfur per 100 parts of rubber, and 10 to 65 parts of a furnace carbon black having a pH from 8.6 to 10.1 per 100 parts of rubber; retarding prevulcanization during mixing by adding 0.5 to 2 parts per 100 parts rubber of chloromercaptobenzimidazol and .5 to 2 parts of rubber of the condensation product of 4-aminodiphenylamine and cyclohexanol to said mix; preforming said rubber product; and vulcanizing said preformed rubber product.

25. A vulcanizable rubber mix which is resistant to prevulcanization which comprises rubber; 0.5 to 3.5 parts of an organic accelerator per 100 parts of rubber; 1.5 to 3 parts of sulfur per 100 parts of rubber; 10 to 65 parts of combustion furnace carbon black having a pH of from 8.6 to 10.1 per 100 parts of rubber; 0.5 to 2 parts of chloromercaptobenzimidazol per 100 parts of rubber; and 0.5 to 2 parts of the condensation product of 4-aminodiphenylamine and cyclohexanol.

References Cited in the file of this patent

UNITED STATES PATENTS

| | | |
|---|---|---|
| 1,933,962 | Bogemann et al. | Nov. 7, 1933 |
| 2,273,995 | Rogerson et al. | Feb. 24, 1942 |
| 2,457,331 | Trepagnier | Dec. 28, 1948 |
| 2,546,446 | Harbison | Mar. 27, 1951 |

OTHER REFERENCES

Today's Furnace Blacks, United Carbon Co. Inc. (W. Va.), 1948.